Figure 1:
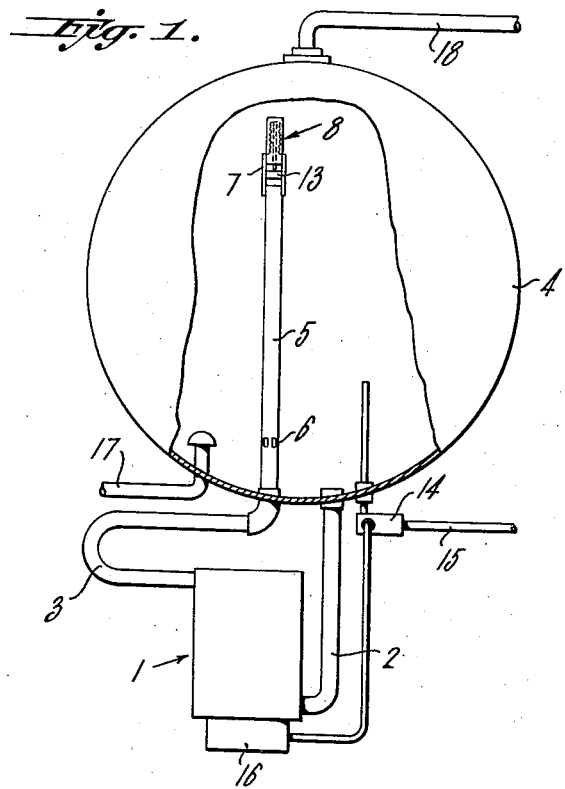

April 6, 1937.  H. J. LONG  2,076,087
WATER HEATER
Filed April 18, 1936

INVENTOR.
HERBERT J. LONG
BY
ATTORNEY.

Patented Apr. 6, 1937

2,076,087

UNITED STATES PATENT OFFICE 2,076,087

WATER HEATER

Herbert J. Long, Springfield, Mass., assignor to United American Bosch Corporation, Springfield, Mass., a corporation of New York Application April 18, 1936, Serial No. 75,075

5 Claims. (Cl. 126—362)

The invention relates to improvements in water heaters of the type in which water heated in a suitable heating unit is stored in a tank for convenient use. The principal objects of the invention are to improve the efficiency of heaters of this type and to prevent the water in the top of the tank from becoming overheated while that in the lower portion thereof remains comparatively cold.

In conventional heaters of this type, cold water from the bottom of the tank passes through a heating unit and thence to the top or an intermediate portion of the tank. A thermostat usually positioned in the lower portion of the tank cuts off the flow of gas or other fuel to the heating unit after a sufficient quantity of water has been heated to fill the tank to the level of the thermostat. This results in the disadvantage that the thermostat must be set to operate at a relatively low temperature, otherwise the temperature at the top of the tank will be far above that desired for domestic purposes. Obviously, if the temperature at the bottom of the tank is relatively low at the time the thermostat cuts off the fuel supply, a large part of the storage capacity of the tank will be wasted since the lower portion which contains only relatively cool water is useless as far as the storage of hot water is concerned. Only a small quantity of water in the top of the tank is at the desired temperature. In some water heaters a compromise is effected by permitting the water in the top of the tank to rise to a temperature which is considerably above the ideal in order that the temperature in the lower portion of the tank will not be too far below domestic requirements. Such a compromise does not alter the fundamental defects of the system. Since radiation increases as the temperature increases, the heat loss from the excessively hot water at the top of the tank is greater than if the entire tank were heated to a moderate, desirable temperature. Furthermore, after the excessively hot water has been drawn, the temperature rapidly falls below the most desired point.

It is the primary object of the present invention to overcome the above mentioned defects, and to this end a construction is provided in which during the initial heating of the tank, hot water from the heating unit is conducted to the top of the tank until the temperature of the water in this portion thereof is at the desired temperature. At this temperature the admission of hot water to the upper portion of the tank is automatically cut off, and thereafter all the hot water is admitted to the bottom of the tank, where, due to convection, it tends to rise to the top. In so doing it increases the temperature of the water throughout the lower and midportions of the tank and when this has reached a temperature which may equal but is preferably somewhat below that of the water at the top of the tank, a thermostat positioned in the bottom of the tank cuts off the fuel supply.

The tank is thus completely filled with warm water, that in the upper portion being at the temperature desired for immediate use and that in the lower portion being at such temperature that it will be raised to the desired temperature by admixture with water directly from the heating unit during periods when water is being withdrawn for use.

Figure 2:
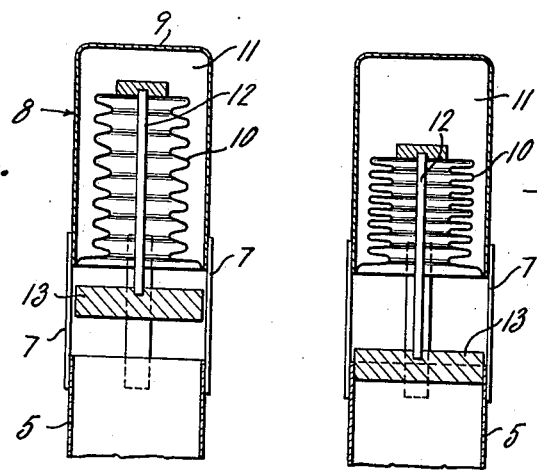
Figure 3:
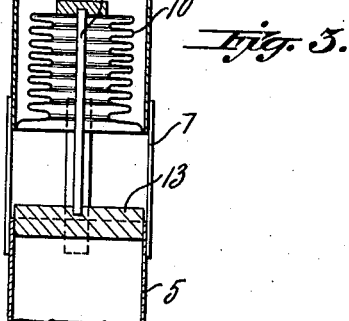

The above and other objects and features of this invention will be more fully set forth in the following detailed description in conjunction with the accompanying drawing in which:

Fig. 1 is a view, partly in section and partly in side elevation, of a water heating system constructed in accordance with this invention; Fig. 2 shows in longitudinal section and on an enlarged scale the details of the temperature control valve, which is shown in open position; and Fig. 3 is a view similar to Fig. 2 but showing the valve in closed position.

Referring to the drawing, reference numeral 1 indicates a conventional heating unit which is connected by means of a cold water inlet pipe 2 and hot water outlet pipe 3 to a storage tank 4. A circulator tube 5 extends upwardly within the tank, being connected at its lower end with the hot water pipe 3 and forming a continuation thereof. Openings 6 are provided in the lower portion of the tube 5, which openings are preferably equal in area to the cross sectional area of the tube 5. Supported upon the upper end of the tube 5 by means of metal strips 7 is a temperature responsive device 8 consisting of a cap or thimble 9 having its lower end closed by an inwardly extending sylphon 10. The thimble 9 and sylphon 10 define a closed chamber 11 containing a fluid which tends to expand as the temperature thereof increases. A stem 12 attached to the sylphon 10 carries a valve 13 which, guided by strips 7, is adapted to obstruct the open end of tube 5 when the fluid in chamber 11 has attained a predetermined temperature.

A thermostat 14 is positioned in the lower portion of the tank, preferably at a point where it may be influenced by the temperature of the water issuing from the openings 6, and is adapted to control the flow of gas or fuel from a supply pipe 15 to burner 16 associated with the heating unit 1. It will be understood that this thermostat is set to close the fuel supply valve at a temperature which preferably is below that prevailing in the upper portion of the tank when the thermostat 8 closes the valve 13, but which is above the temperature at which thermostats similarly positioned must be set in conventional practice.

The tank 4 is provided with a suitable cold water supply pipe 17 opening into the lower portion thereof and a hot water discharge pipe 18 leading from its upper portion.

In the operation of the device, when the heater is started from cold, the thermostat 14 permits the flow of fuel to the burner, and the circulation control valve 13 is open permitting the flow of hot water from the heating unit through the circulator to the upper portion of the tank. The openings 6 in the lower portion of the circulator tube 5 are, in the form shown, continuously open but at this time little or none of the hot water flows out through these lower openings. The major portion of it rises through the circulator to flow out of the unobstructed openings at the top thereof. This permits the water in the top of the tank to be rapidly heated to the desired temperature so that very shortly after lighting the burner, a quantity of hot water is available at the top of the tank for immediate use. As soon as the temperature of the water surrounding the chamber 11 of the thermostat 8 has risen to the desired temperature, the fluid in this chamber expands and acting upon the sylphon 10 forces the attached valve 13 downwardly to obstruct and close the upper open end of the circulator. The hot water from the heating unit now passes out through the lower openings 6 in the circulator and diffuses through the entire body of liquid in the tank. The temperature of the entire body is gradually increased being in part recirculated through the cold water inlet to the heating unit until the body of water surrounding the lower thermostat 14 reaches the temperature for which its element is set. This thermostat then cuts off the supply of gas to the burner. The withdrawal of a small quantity of water from the top of the heater does not immediately start the burner. If the withdrawal of water from the top of the tank continues, cold water from the cold water supply soon fills the lower portion of the tank surrounding the thermostat and this element opens the main gas supply valve again placing the burner in operation.

If the temperature of the water at the top of the tank is still high, hot water from the heating unit will now flow out through the lower opening 6 maintaining the temperature of the water throughout the major portion of the tank. In case water continues to be drawn for use at a rapid rate, the temperature in the top of the tank will fall sufficiently to permit the thermostat 8 to open the valve 13. Hot water will now be supplied directly to the top of the heater and this water mixing with the warm water from the lower portion of the tank, maintains the temperature of the water withdrawn to within close limits of the most desired temperature for use.

As shown, I prefer to use a spherical or substantially spherical storage tank, but it will be understood that the invention is useful in conjunction with any conventional type of storage tank. However, in the spherical form shown, I have found that due to the curving walls of the lower portion of the tank, the circulation of the hot water issuing from the openings 6 is better than if the water from these openings impinges upon a vertically extending wall of the conventional cylindrical tank.

It will be seen that by the above described invention I have provided a water heating system in which the entire capacity of the storage tank is utilized to provide an ample supply of hot water available for use. At the same time a supply of hot water is promptly available to the user even when starting from cold and large quantities can be withdrawn for use without objectionable changes in the temperature. It will be readily understood that such a construction in avoiding a supply of hot water at excessive temperatures consumes less fuel than would otherwise be the case.

While the invention has been described in conjunction with a single preferred embodiment, the application of the invention to numerous forms of water heaters in general use will be obvious to those skilled in the art from the above disclosure.

Having thus described the invention, what is claimed as new is:

1. A water heater including in combination a heating unit, a storage tank, a passage between said heating unit and said tank to conduct water from said tank to said heating unit, a return passage between said heating unit and said tank having a plurality of discharge openings into said tank at different levels thereof, and a thermostat responsive to the temperature in the upper portion of said tank to control the relative amounts of flow through said openings.

2. A water heater including in combination a heating unit, a storage tank, a thermostat in the lower portion of said tank controlling the flow of fuel to said heating unit, a passage between said heating unit and said tank to conduct water from said tank to said heating unit, a return passage leading from said heating unit and having a plurality of discharge openings into said tank, at different levels thereof, one of said openings being in the zone of said thermostat, and a second thermostat responsive to the temperature in the upper portion of said tank to control the relative amounts of flow through said openings.

3. A water heater including in combination a heating unit, a storage tank, communicating pipes between said heating unit and said tank, a delivery pipe for the heated water extending from the bottom to a point adjacent the top of said tank, a discharge opening in said delivery pipe in the lower portion thereof, a second discharge opening in said delivery pipe in the upper portion thereof, and a thermostat controlling said second opening.

4. A water heater including in combination a heating unit, a storage tank, a passage between said heating unit and said tank to conduct water from said tank to said heating unit, a return passage between said heating unit and said tank having a plurality of discharge openings into said tank at different levels thereof, and a thermostat controlling the uppermost of said discharge openings.

5. A water heater including in combination a heating unit, a storage tank, a passage between said heating unit and said tank to conduct water from said tank to said heating unit, a return passage between said heating unit and said tank having a plurality of discharge openings into said tank at different levels thereof, and a thermostat in the upper portion of said tank to control the relative amounts of flow through said openings, the side walls of said tank curving outwardly and upwardly from the lowermost opening.

HERBERT J. LONG.